(12) United States Patent
Jadhav (10) Patent No.: US 10,408,684 B2
(45) Date of Patent: Sep. 10, 2019

(54) INTEGRATED THERMAL MANAGEMENT OF STORAGE DRIVES

(71) Applicant: SEAGATE TECHNOLOGY LLC, Cupertino, CA (US)

(72) Inventor: Piyush Gangadhar Jadhav, Pune (IN)

(73) Assignee: SEAGATE TECHNOLGY LLC, Cupertino, CA (US)

(*) Notice: Subject to any disclaimer, the term of this patent is extended or adjusted under 35 U.S.C. 154(b) by 1 day.

(21) Appl. No.: 15/809,148

(22) Filed: Nov. 10, 2017

(65) Prior Publication Data

US 2019/0145835 A1 May 16, 2019

(51) Int. Cl.
*G01K 3/00* (2006.01)
*G06F 3/06* (2006.01)
*G06F 13/42* (2006.01)
*G01K 1/02* (2006.01)
*G06F 13/40* (2006.01)

(52) U.S. Cl.
CPC .............. *G01K 3/005* (2013.01); *G01K 1/026* (2013.01); *G06F 3/061* (2013.01); *G06F 3/0653* (2013.01); *G06F 3/0659* (2013.01); *G06F 3/0685* (2013.01); *G06F 13/4022* (2013.01); *G06F 13/4282* (2013.01); *G06F 2213/0016* (2013.01); *G06F 2213/0026* (2013.01); *G06F 2213/0028* (2013.01)

(58) Field of Classification Search
CPC .......... G01K 3/005; G01K 3/064; G01K 1/26; G06F 3/061; G06F 3/0653; G06F 3/0659; G06F 3/0685; G06F 13/4022; G06F 13/4282

See application file for complete search history.

(56) References Cited

U.S. PATENT DOCUMENTS

| 7,050,254 B1 | 5/2006 | Yu et al. |
| 7,533,283 B2 | 5/2009 | Fung |
| 7,549,065 B2 | 6/2009 | Schutte |
| 9,361,046 B1* | 6/2016 | Martin .................. G06F 3/0686 |
| 2007/0064391 A1* | 3/2007 | Lewis, II ........... H05K 7/20736 361/695 |
| 2008/0123238 A1* | 5/2008 | Campos ................. G01K 3/005 361/103 |
| 2008/0174960 A1* | 7/2008 | Kehret ............... H05K 7/20563 361/696 |
| 2017/0094832 A1* | 3/2017 | Pitwon ............... H05K 7/20836 |
| 2017/0147047 A1* | 5/2017 | Curtis ..................... G06F 1/206 |

* cited by examiner

*Primary Examiner* — Nimesh G Patel
(74) *Attorney, Agent, or Firm* — Holland & Hart LLP (57) ABSTRACT

Systems and methods for integrated thermal management of storage drives are described. In one embodiment, the storage system device may include a storage enclosure, a plurality of storage drives enclosed in the storage enclosure, and one or more processors in each of the plurality of storage drives. In some cases, the plurality of storage drives may include a first storage drive and a second storage drive. In some embodiments, the one or more processors of the first storage drive may be configured to activate a drive temperature monitor of the first storage drive in response to a manufacturer specific command, detect a temperature event of the first storage drive, and send a notification to the storage enclosure upon detecting the temperature event, the notification indicating the temperature event.

20 Claims, 7 Drawing Sheets

INTEGRATED THERMAL MANAGEMENT OF STORAGE DRIVES

SUMMARY

The present disclosure is directed to methods and systems for integrated thermal management of storage drives. In some embodiments, the present systems and methods may integrate thermal management systems directly within storage drives located in a storage enclosure.

A storage system for integrated thermal management of storage drives is described. In one embodiment, the storage system device may include a storage enclosure, a plurality of storage drives enclosed in the storage enclosure, and one or more processors in each of the plurality of storage drives. In some cases, the plurality of storage drives may include a first storage drive and a second storage drive. In some embodiments, the one or more processors may include at least one hardware processor. In some cases, the one or more processors may include at least one hardware storage controller. In some embodiments, the one or more processors of the first storage drive may be configured to activate a drive temperature monitor of the first storage drive in response to a manufacturer specific command, detect a temperature event of the first storage drive, and send a notification to the storage enclosure upon detecting the temperature event, the notification indicating the temperature event.

In some cases, the storage enclosure determines the first storage drive includes the drive temperature monitor based at least in part on the storage enclosure identifying at least one identifier in a capability message from the first storage drive and determining the at least one identifier indicates the first storage drive includes the drive temperature monitor. In some cases, the storage enclosure may send the manufacturer specific command to the first storage drive upon determining the capability message indicates the first storage drive includes the drive temperature monitor.

In some cases, the at least one identifier in the capability message may include a storage drive identifier unique to the first storage drive or a manufacturer identifier indicating a manufacturer of the first storage drive, or both. In some cases, the device inquiry command includes a first small computer system interface (SCSI) command. In some examples, the manufacturer specific command may include a second SCSI command. In some cases, the second SCSI command may be configured to be interpreted only by storage drives made by the manufacturer of the first storage drive.

In one embodiment, the one or more processors of the first storage drive may be configured to set a first temperature threshold of the first storage drive to a first value. In some cases, the detecting of the temperature event of the first storage drive may be based at least in part on the drive temperature monitor monitoring a temperature of the first storage drive and the processor of the first storage drive determining the monitored temperature satisfies the first temperature threshold.

In one embodiment, the one or more processors of the first storage drive may be configured to set a second temperature threshold of a second storage drive to a second value. In some cases, the second value may be different than the first value. In some cases, an intermediary device communicatively connects the plurality of storage drives to the storage enclosure. In some cases, the intermediary device relays commands and communications between the plurality of storage drives and the storage enclosure.

In some cases, the intermediary device includes a serially attached small computer system interface (SAS) expander, a peripheral component interconnect express (PCIe) switch, or both. In some cases, a connection between the storage enclosure and the intermediary device includes an inter-integrated circuit (I2C) connection or an Ethernet connection, or both. In some cases, a connection between the intermediary device and the plurality of storage drives includes a small computer system interface (SCSI) connection, a serially attached SCSI (SAS) connection, a serial advanced technology attachment (SATA) connection, or a peripheral component interconnect express (PCIe) connection, or any combination thereof.

A method for integrated thermal management of storage drives is also described. In one embodiment, the method may include receiving a device inquiry command sent by a storage enclosure, sending a capability message to the storage enclosure, activating a drive temperature monitor of the first storage drive in response to a manufacturer specific command, detecting a temperature event of the first storage drive, and sending a notification to the storage enclosure upon detecting the temperature event. In some cases, the notification may indicate the temperature event. In some examples, the capability message may indicate at least one capability of the first storage drive. In some examples, the storage enclosure may include a plurality of storage drives that includes the first storage drive. In some examples, the storage enclosure may send the manufacturer specific command to the first storage drive upon determining the capability message indicates the first storage drive includes the drive temperature monitor.

A computer-program product to improve a storage system is also described. The computer-program product may include a non-transitory computer-readable medium storing instructions thereon, the instructions being executable by one or more processor to perform the steps of receiving a device inquiry command sent by the storage enclosure, sending a capability message to the storage enclosure, activating a drive temperature monitor of the first storage drive in response to a manufacturer specific command, detecting a temperature event of the first storage drive, and sending a notification to the storage enclosure upon detecting the temperature event. In some cases, the notification may indicate the temperature event. In some examples, the capability message may indicate at least one capability of the first storage drive. In some examples, the storage enclosure may send the manufacturer specific command to the first storage drive upon identifying at least one identifier in the capability message and determining the at least one identifier indicates the first storage drive includes the drive temperature monitor.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

The following relates generally to integrated thermal management of storage drives. The present systems and methods improve temperature monitoring systems associated with storage devices. The storage devices may include one or more storage drives. The one or more storage drives may be part of a cloud storage system, a distributed data storage system, one or more storage enclosures, one or more storage servers, one or more computing devices, or any combination thereof. The storage drives may include hard disk drives (HDDs), solid state drives (SSDs), and/or hybrid drives that include a hard disk storage media and solid state storage media. The storage drives may include small computer system interface (SCSI) drives, serially attached SCSI (SAS) drives, serial advanced technology attachment (SATA) drives, peripheral component interconnect express (PCIe) drives, or any combination thereof.

With a conventional system, drive temperature may be monitored by enclosure management firmware. On the conventional system, the enclosure management firmware may be installed on and/or executed by a storage enclosure. The storage enclosure may include one or more storage drives installed in the enclosure. In some cases, the enclosure management firmware may poll each drive in the enclosure. With the conventional system, the enclosure management firmware may repeatedly poll each drive in a predetermined looping sequence, first polling a first storage drive, then a second storage drive, then a third drive, and so on until reaching the last drive. Upon reaching the last drive, the enclosure management firmware may again poll the first storage drive, then the second storage drive, and so on. As a result, a conventional system may spend a considerable amount of time just on polling the several drives of a storage enclosure.

With the conventional system, time taken by the enclosure management firmware to perform a single polling cycle of the several drives increases as the number of drives in the enclosure increases. The configuration of the conventional system results in a relatively slower system response to critical events such as detecting a drive temperature crossing or exceeding a temperature threshold. Furthermore, the conventional system may result in data path consumption in cases of in-band access for management activities (e.g. SAS drives). In some cases, conventional polling may use at least a portion of the bandwidth of the channel over which user data is written to a storage drive and/or accessed from the storage drive in conjunction with a user application.

Based on the present systems and methods, drive temperature management may be improved by actively involving drive firmware to monitor and report temperature related incidents (e.g. detected breaches of a predetermined temperature threshold, etc.) instead of relying on enclosure management firmware to poll storage drives continuously.

In some embodiments, a storage enclosure may be configured to power on and spin up at least a first storage drive located within the storage enclosure. The storage enclosure may include one or more processors configured to execute or perform one or more operations. In some cases, the storage enclosure may include a plurality of storage drives that include at least a first storage drive and a second storage drive.

In one embodiment, the storage enclosure may read one or more capabilities of at least the first storage drive. In some cases, the reading of the one or more capabilities of the first storage drive may include the storage enclosure instructing an intermediary device to send an information request to the first storage drive, and the first storage drive providing the requested information to the storage enclosure upon receiving the information request. In one example, the intermediary device may include a serially attached small computer system interface (SAS) expander, a peripheral component interconnect express (PCIe) switch, or both. In some cases, the first storage drive may provide the requested information to the intermediary device and the intermediary device may in turn provide the requested information to the storage enclosure.

In one embodiment, the intermediary device may connect the plurality of storage drives to the storage enclosure. In some cases, a connection between the storage enclosure and the intermediary device may include an inter-integrated circuit (I2C) connection or an Ethernet connection, or both. In some cases, a connection between the intermediary device and the storage drive includes a small computer system interface (SCSI) connection, a serially attached SCSI (SAS) connection, a serial advanced technology attachment (SATA) connection, or a peripheral component interconnect express (PCIe) connection, or any combination thereof.

In one embodiment, the storage enclosure may determine whether the first storage drive includes a drive temperature monitor. For example, at least the first storage drive may include a first drive temperature monitor internal to the first storage drive. Additionally or alternatively, the second storage drive may include a second drive temperature monitor internal to the second storage drive, and so on. In some embodiments, the storage enclosure may analyze the requested information provided by the first storage drive. In one embodiment, the storage enclosure may determine the first storage drive includes a drive temperature monitor based at least in part on the storage enclosure analyzing the requested information. In some cases, determining whether the first storage drive includes a drive temperature monitor may include determining whether the first storage drive is manufactured by a particular storage drive manufacturer. Upon determining the storage drive is manufactured by a particular manufacturer of storage drives, the storage enclosure may determine that the storage drive includes a drive temperature monitor. Additionally or alternatively, the storage enclosure determining whether the first storage drive includes a drive temperature monitor may include the intermediary device and/or storage enclosure identifying a device identifier or version identifier in the requested information and the storage enclosure determining whether the device identifier or the version identifier indicates the first storage drive includes a drive temperature monitor.

In one embodiment, upon determining the first storage drive includes a drive temperature monitor, the storage enclosure may instruct the first storage drive to initiate or activate the drive temperature monitor. In some cases, the instructing of the first storage drive to initiate or activate the drive temperature monitor of the first storage drive may include the storage enclosure sending a monitoring request to the intermediary device. In some cases, the monitoring request may request that the intermediary device instruct the first storage drive to initiate or activate the drive temperature monitor of the first storage drive.

In some cases, the intermediary device uses a SCSI command to instruct the first storage drive to initiate the drive temperature monitor. In some cases, the SCSI command includes a manufacturer specific SCSI command. A manufacturer specific SCSI command may include a command that is configured to be understood or correctly interpreted only by storage drives made by a particular manufacturer.

In one embodiment, the first storage drive may initiate its drive temperature monitor upon receiving the instructions from the intermediary device to initiate its drive temperature monitor.

In some cases, upon initiating its drive temperature monitor, the first storage drive may monitor one or more temperatures associated with the first storage drive. In some cases, the drive temperature monitor of the first storage drive may monitor a temperature of one or more components of the first storage drive. Additionally or alternatively, the drive temperature monitor of the first storage drive may measure and track an average temperature of the first storage drive. In some cases, the drive temperature monitor of the first storage drive may measure and track an ambient temperature of the surrounding environment of the first storage drive. For example, the drive temperature monitor of the first storage drive may measure an internal temperature of the first storage drive and an external temperature of the first storage drive.

In one embodiment, the drive temperature monitor of the first storage drive may compare a monitored temperature of the first storage drive to a predetermined temperature threshold. In one embodiment, the first storage drive may include two or more temperature thresholds. For example, the drive temperature monitor may include a first threshold for an internal temperature of the first storage drive and a second threshold for the external temperature of the first storage drive. In some cases, at least two of the storage drives from the plurality of storage drives may include separate, independent temperature thresholds. For example, the drive temperature monitor may set a first temperature threshold to a first value for the first storage drive, and set a second temperature threshold to a second value for the second storage drive, where the second value is different than the first value.

In one embodiment, upon detecting the monitored temperature satisfies the temperature threshold, the drive temperature monitor may generate a notification indicating the monitored temperature satisfies an associated temperature threshold. For example, when the monitored temperature exceeds a predetermined temperature threshold, the storage drive may generate a notification indicating an occurrence of the temperature related event. In some cases, the drive temperature monitor may notify the storage enclosure of the generated event. As one example, the storage drive may send the generated notification to the storage enclosure. In some embodiments, the storage drive may notify the intermediary device of the generated event and in turn the intermediary device may notify the storage enclosure. For example, the storage drive may send the generated notification to the intermediary device and the intermediary device may transmit the received notification to the storage enclosure.

In one embodiment, the intermediary device and/or storage enclosure may identify the source of the notification. In some examples, the intermediary device and/or storage enclosure may identify the storage drive that generated the notification based on an identifier. In some cases, the storage drive may include a storage drive identifier in the notification. Accordingly, the intermediary device and/or storage enclosure may identify which storage drive generated the notification based on an identifier in the notification. In some cases, the intermediary device and/or storage enclosure may respond to the storage drive that sends the notification and request an identifier in the response. In some embodiments, a data field of a message protocol the storage drive uses to send the notification may include a sender identifier. In some cases, the intermediary device and/or storage enclosure may identify the storage drive based on the sender identifier.

In some embodiments, upon receiving the notification the intermediary device may forward the notification to the storage enclosure. Upon receiving the notification, the storage enclosure may analyze information included in the notification. Additionally or alternatively, the storage enclosure may analyze information sent with and/or associated with the notification. In some cases, the storage enclosure may identify event details from the notification, analyze the event details, and then take one or more predetermined actions based at least in part on the analysis. In some cases, the storage enclosure may read particular drive data to get event details.

In one embodiment, the storage enclosure may generate one or more system events and take recovery action on the identified storage drive based at least in part on analysis of an event indicated in a notification generated by the identified storage drive (i.e., the storage drive that experienced the temperature-related event and generated a notification of the event). In one embodiment, the recovery action may include the storage enclosure turning off access to the identified storage drive. In some cases, the recovery action may include the storage enclosure transferring data stored on the identified storage drive to one or more other storage drives in the same storage enclosure that includes the identified storage drive and/or transfer at least a portion of the data stored on the identified storage drive to one or more storage drives located in a different storage enclosure. In some cases, the recovery action may include the storage enclosure sending an alert to an administrator of the storage enclosure. In some embodiments, the alert sent to the administrator may include at least a portion of information included in and/or associated with the notification from the identified storage drive.

Figure 1:
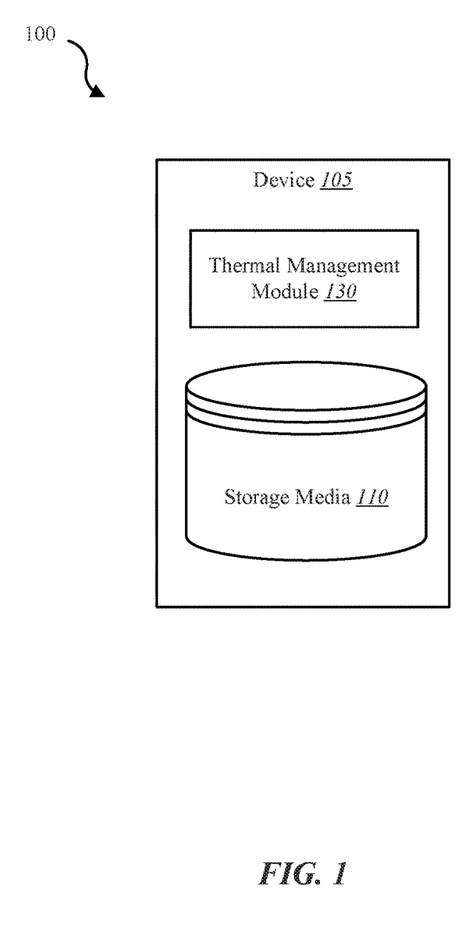
FIG. 1 is a block diagram of an example of a system in accordance with various embodiments.

FIG. 1 is a block diagram illustrating one embodiment of an environment 100 in which the present systems and methods may be implemented. The environment may include device 105 and storage media 110. The storage media 110 may include any combination of one or more hard disk drives, one or more solid state drives, and/or one or more hybrid drives that include both hard disk and solid state drives in a single storage drive enclosure. In some embodiment, the storage media 110 may include shingled magnetic recording (SMR) storage drives. In some embodiments, the systems and methods described herein may be performed on a single device such as device 105. In some cases, the methods described herein may be performed on multiple storage devices or a network of storage devices such a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include thermal management module 130. In one example, the device 105 may be coupled to storage media 110. In some embodiments, device 105 and storage media 110 may be components of flash memory or a solid state drive and/or another type of storage drive. Alternatively, device 105 may be a component of a host of the storage media 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, the database may include a connection to a wired and/or a wireless database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage media 110 may be internal to device 105. As one example, device 105 may include a storage controller that interfaces with storage media of storage media 110. Thermal management module 130 may detect a storage device related event such as an event that affects the operation of a storage device. For example, thermal management module 130 may detect thermal related events associated with device 105. In some cases, thermal management module 130 may detect events that adversely affect the operation of a storage device. In some embodiments, thermal management module 130 may store the detected event in a log that includes multiple detected events. The log may include detected events from a single storage device or events from two or more storage devices. In some embodiments, thermal management module 130 may search the log of detected events to identify frequently occurring event patterns. For example, thermal management module 130 may identify an event pattern such as event A occurring first, then event B after event A, and then event C after event B occurring frequently among all the detected events stored in the log.

Figure 2:
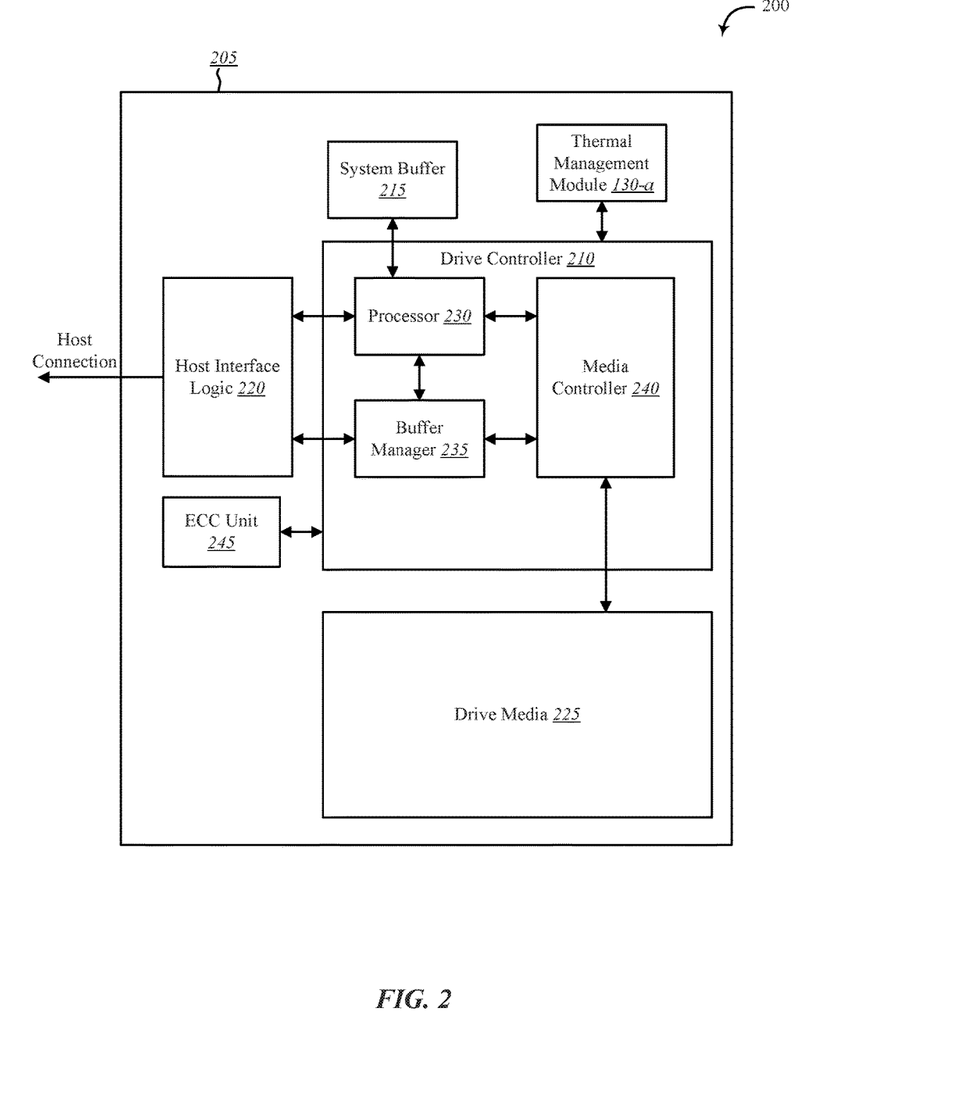
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and thermal management module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, ECC unit 245 may perform error correction on data stored in drive media 225.

In some embodiments, thermal management module 130-a may include at least one of one or more processors, one or more memory devices, one or more storage devices, instructions executable by one or more processors stored in one or more memory devices and/or storage devices, or any combination thereof. Although depicted outside of drive controller 210, in some embodiments, thermal management module 130-a may include software, firmware, and/or hardware located within drive controller 210 and/or operated in conjunction with drive controller 210. For example, thermal management module 130-a may include at least a portion of processor 230, buffer manager 235, and/or media controller 240. In one example, thermal management module 130-a may include one or more instructions executed by processor 230, buffer manager 235, and/or media controller 240.

Figure 3:
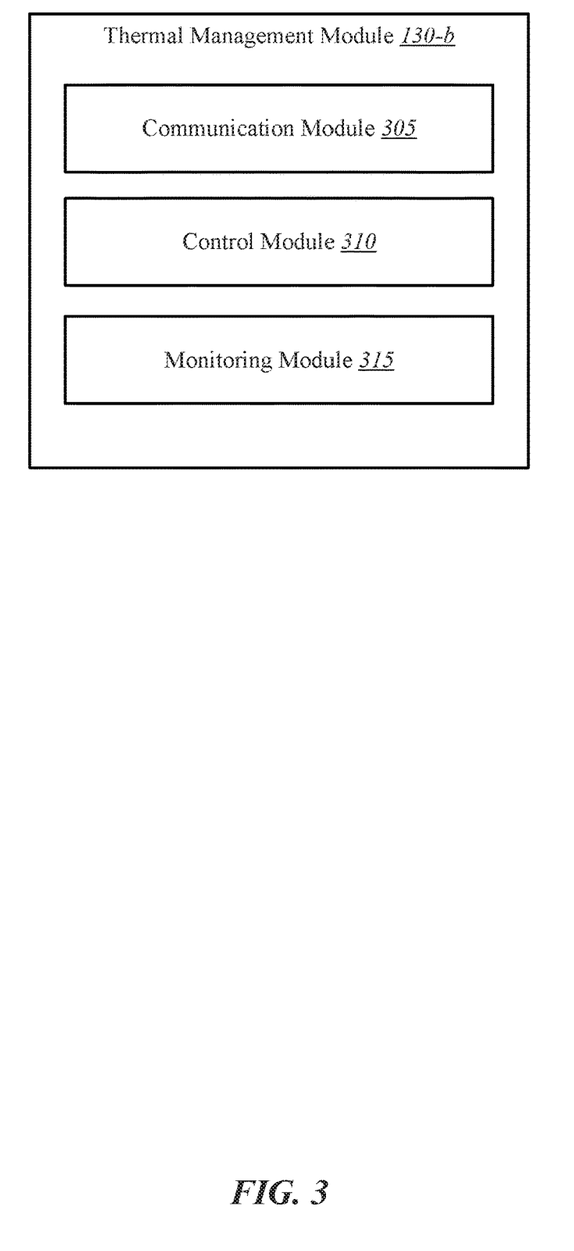
FIG. 3 shows a block diagram of one or more modules in accordance with various aspects of this disclosure.

FIG. 3 shows a block diagram of thermal management module 130-b. The thermal management module 130-b may include one or more processors, memory, and/or one or more storage devices. The thermal management module 130-b may include communication module 305, control module 310, and monitoring module 315. The thermal management module 130-b may be one example of thermal management module 130 of FIGS. 1 and/or 2. Each of these components may be in communication with each other.

In one embodiment, thermal management module 130 may include software, firmware, one or more processors, one or more memory devices, and/or one or more storage devices. In some cases, thermal management module 130 may perform one or more operations in conjunction with one or more processors. In some cases, thermal management module 130 may be located in a storage enclosure or in a storage drive, or both. In some cases, thermal management module 130 may be included in an intermediary device between a storage enclosure and a storage drive inside the storage enclosure.

In one embodiment, communication module 305 may be configured to receive a device inquiry command at a storage drive. In some cases, communication module 305 may send the device inquiry command in conjunction with a storage enclosure enclosing the storage drive that receives the device inquiry command.

In some cases, the storage enclosure may include one or more storage drives. In one example, the one or more storage drives may include at least a first storage drive and a second storage drive. In some embodiments, communication module 305 may be configured to send a capability message to the storage enclosure. In some cases, the capability message may indicate at least one capability of the first storage drive.

In some cases, the storage enclosure determines the first storage drive includes a drive temperature monitor based at least in part on the storage enclosure identifying at least one identifier in the capability message and determining the at least one identifier indicates the first storage drive includes the drive temperature monitor. In some embodiments, the at least one identifier in the capability message may include a storage drive identifier unique to the first storage drive or a manufacturer identifier indicating a manufacturer of the first storage drive, or both.

In some embodiments, monitoring module 315 may include a drive temperature monitor. In one embodiment, control module 310 may be configured to activate a drive temperature monitor of the first storage drive in response to a manufacturer specific command. In one example, the manufacturer specific command may include a command configured to be interpreted only by storage drives made by a particular manufacturer. In some cases, the storage enclosure, in conjunction with communication module 305, may send the manufacturer specific command to the first storage drive upon determining the capability message indicates the first storage drive includes the drive temperature monitor. In some cases, the device inquiry command may include a first small computer system interface (SCSI) command. In some cases, the manufacturer specific command may include a second SCSI command. In one example, the second SCSI command may be configured to be interpreted only by storage drives made by the manufacturer of the first storage drive.

In one embodiment, monitoring module 315 may be configured to monitor one or more temperatures of a storage drive. In some cases, monitoring module 315 may monitor one or more temperatures of a storage drive located in a storage enclosure among multiple storage drives in the storage enclosure. In some cases, monitoring module 315 may include one or more temperature sensors in a first storage drive. In some embodiments, monitoring module 315 may be configured to detect, in conjunction with the one or more temperatures sensors, a temperature event of the first storage drive. In some cases, the detecting of the temperature event of the first storage drive by monitoring module 315 may be based at least in part on monitoring module 315 monitoring and/or measuring a temperature of the first storage drive and a processor of thermal management module 130 and/or monitoring module 315 determining whether the monitored/measured temperature satisfies a temperature threshold.

As one example, a temperature event of the first storage drive detected by monitoring module 315 may indicate the first storage drive is operating outside a predetermined range of operating temperatures. In some embodiments, monitoring module 315 may monitor one or more different temperatures of the first storage drive. For example, monitoring module 315 may monitor an internal operating temperature of the first storage drive when the first storage drive is powered on. Additionally or alternatively, monitoring module 315 may monitor a non-operating temperature of the first storage drive when the first storage drive is in a low-power mode, in a sleep mode, and/or powered off. Additionally or alternatively, monitoring module 315 may monitor a temperature change rate to determine whether a rate at which a temperature of the first storage drive changes satisfies a temperature change rate threshold. In one example, the first storage drive may be configured to operate safely within the range of 0 degrees Celsius (C) and 60 C. When monitoring module 315 detects the first storage drive is in an operating mode and has an internal temperature below 0 C or above 60 C, monitoring module 315 may generate a temperature event. As one example, the first storage drive may be configured with a non-operating temperature range between −40 C and 75 C. When monitoring module 315 detects the first storage drive is in a non-operating mode and a temperature of the first storage drive is below −40 C or above 75 C, monitoring module 315 may generate a temperature event. As one example, the first storage drive may be configured with a maximum temperature change range of 20 C per hour, or 10 C per 30 minutes, or 5 C per 15 minutes, etc. When monitoring module 315 detects the temperature of the first storage drive changing more than 20 C within one hour, monitoring module 315 may generate a temperature event.

In some embodiments, communication module 305 may be configured to generate a temperature event notification when monitoring module 315 detects the temperature event. In some embodiments, communication module 305 may be configured to send the notification to the storage enclosure upon generating the temperature event notification. In some cases, the notification may indicate one or more aspects of the temperature event. The one or more aspects of the temperature event may include at least one of a timestamp of when the event is detected, at least one measured temperature of the storage drive (e.g., a measured temperature of the storage drive when the event is detected, one or more measured temperatures of the storage drive before the event, one or more measured temperatures of the storage drive after the event, etc.), an identifier of the affected storage drive, or any combination thereof.

In some embodiments, control module 310 may be configured to set a first temperature threshold of a first storage drive to a first value. Additionally or alternatively, control module 310 may be configured to set a second temperature threshold of a second storage drive to a second value. In some cases, the second value may be a different value than the first value.

In one embodiment, an intermediary device may communicatively connect the storage enclosure to the multiple storage drives within the storage enclosure. In some cases, the intermediary device may relay commands and/or communications between the multiple storage drives and the storage enclosure.

In some cases, the intermediary device may include a serially attached SCSI (SAS) expander, a peripheral component interconnect express (PCIe) switch, a serial AT attachment (SATA) expander, or both. In some cases, the SAS expander, PCIe switch, and/or SATA expander may include a circuit board with one or more PHY chips and/or one or more connectors such as SCSI connectors, SAS connectors, SATA connectors, PCIe connectors, etc. In some cases, a connection between the storage enclosure and the intermediary device may include an inter-integrated circuit (I2C) connection or an Ethernet connection, or both. In some cases, a connection between the intermediary device and the plurality of storage drives may include at least one of a SCSI connection, a SAS connection, a SATA connection, or PCIe connection, or any combination thereof.

In one embodiment, the PHY of the intermediary device, in conjunction with monitoring module 315, may detect a temperature event of a storage drive connected to the intermediary device. In some cases, the PHY of the intermediary device, in conjunction with monitoring module 315, may be configured to detect a temperature event and to identify one or more aspects associated with the temperature event such as a timestamp of the temperature event, at least one measured temperature of the storage drive, an identifier of the affected storage drive, or any combination thereof. In some cases, the PHY of the intermediary device, in conjunction with communication module 305, may receive a notification from the storage drive and relay the notification on to the storage enclosure. Additionally or alternatively, the PHY, in conjunction with monitoring module 315, may detect and analyze the temperature event of the storage drive, identify information from the detected temperature event such as the affected storage drive, etc. In some cases, the PHY may generate, in conjunction with communication module 305, a notification based on analysis of the temperature event and send the generated notification to the storage enclosure. Upon receiving the notification, the storage enclosure may process the notification and perform one or more event actions. The event actions may include at least one of disabling the affected storage drive, powering down the affected storage drive, sending a notification to a predetermined administrator of the storage enclosure identifying the affected storage drive and a location of the affected storage drive within the storage enclosure, or any combination thereof.

Figure 4:
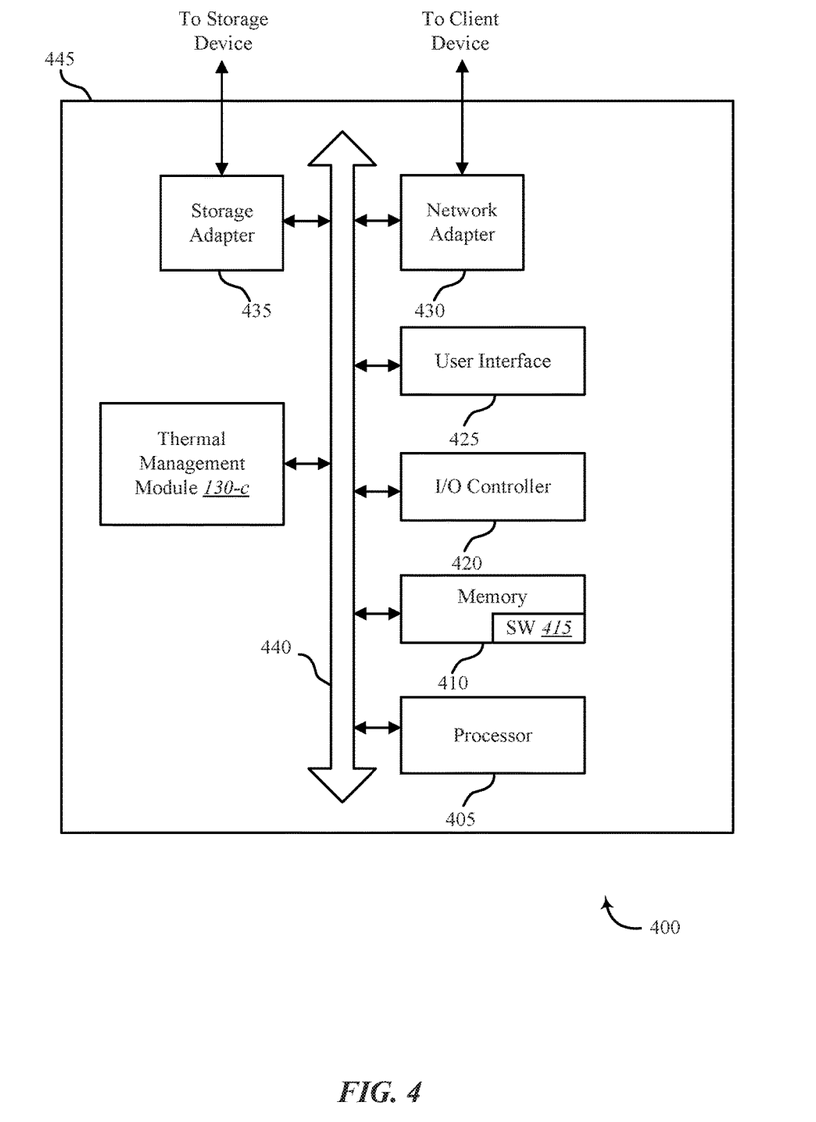
FIG. 4 shows a diagram of a system in accordance with various aspects of this disclosure.

FIG. 4 shows a system 400 for integrated thermal management of storage drives, in accordance with various examples. System 400 may include an apparatus 445, which may be an example of any one of device 105 of FIG. 1 and/or device 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (apparatus 445 communicating directly with a storage system, for example) and/or indirect (apparatus 445 communicating indirectly with a client device through a server, for example).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include thermal management module 130-c, which may perform the functions described above for the thermal management module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 such as processor module 405, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (when compiled and executed, for example) to perform functions described herein. Alternatively, the computer-readable, computer-executable software/firmware code 415 may not be directly executable by the processor module 405, but may be configured to cause a computer, when compiled and executed, to perform functions described herein. The processor module 405 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the thermal management module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 445 to access one or more data storage devices such as storage device 110. The one or more data storage devices may include two or more data tiers each. The storage adapter 445 may include one or more of an Ethernet adapter, a Fibre Channel adapter, Fibre Channel Protocol (FCP) adapter, a SCSI adapter, and iSCSI protocol adapter.

Figure 5:
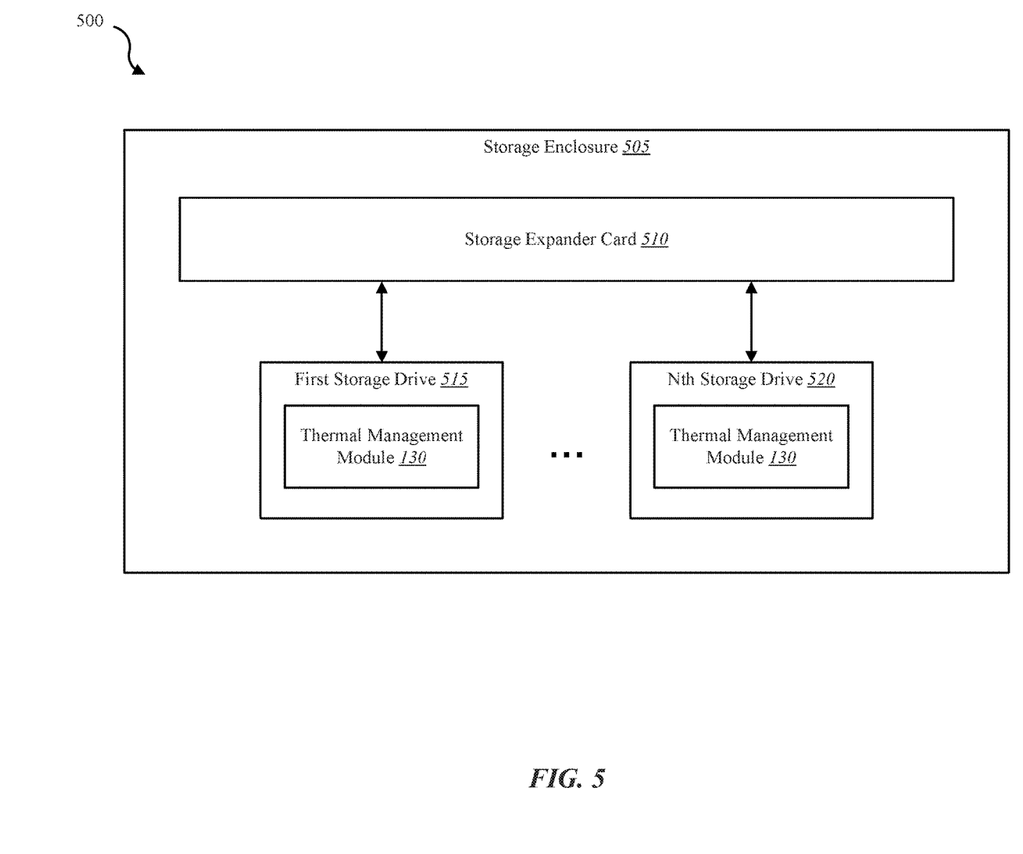
FIG. 5 shows one embodiment of an environment in accordance with various aspects of this disclosure.

FIG. 5 shows an environment 500 for integrated thermal management of storage drives, in accordance with various examples. At least one aspect of environment 500 may be implemented in conjunction with device 105 of FIG. 1, apparatus 205 of FIG. 2, and/or thermal management module 130 depicted in FIGS. 1, 2, 3, and/or 4.

As depicted, environment 500 may storage enclosure 505. Environment 500 may include one or more additional storage enclosures in addition to storage enclosure 505. The one or more additional storage enclosures may be similar or different than storage enclosure 505.

As shown, storage enclosure 505 may include an intermediary device such as storage expander card 510. In some embodiments, storage expander card 510 may include one or more storage drives. For example, storage expander card 510 may include first storage drive 515 up to Nth storage drive 520, where N is a positive integer of 2 or greater. As indicated, first storage drive 515 up to Nth storage drive 520 may each include an instance of thermal management module 130.

In some cases, the storage expander card 510 may include at least one of a SAS expander card, a PCIe switch, a SATA expander card, or any combination thereof. In some cases, storage expander card 510 may include one or more connectors that provide connections between storage expander card 510 and storage enclosure 505 and/or connections between storage expander card 510 and storage drives 515 to 520. For example, a connection between the storage enclosure 505 and the storage expander card 510 may include an I2C connection or an Ethernet connection, or both. Additionally or alternatively, a connection between the storage expander card 510 and the storage drives 515 to 520 may include a SCSI connection, a SAS connection, a SATA connection, or a PCIe connection, or any combination thereof.

Figure 6:
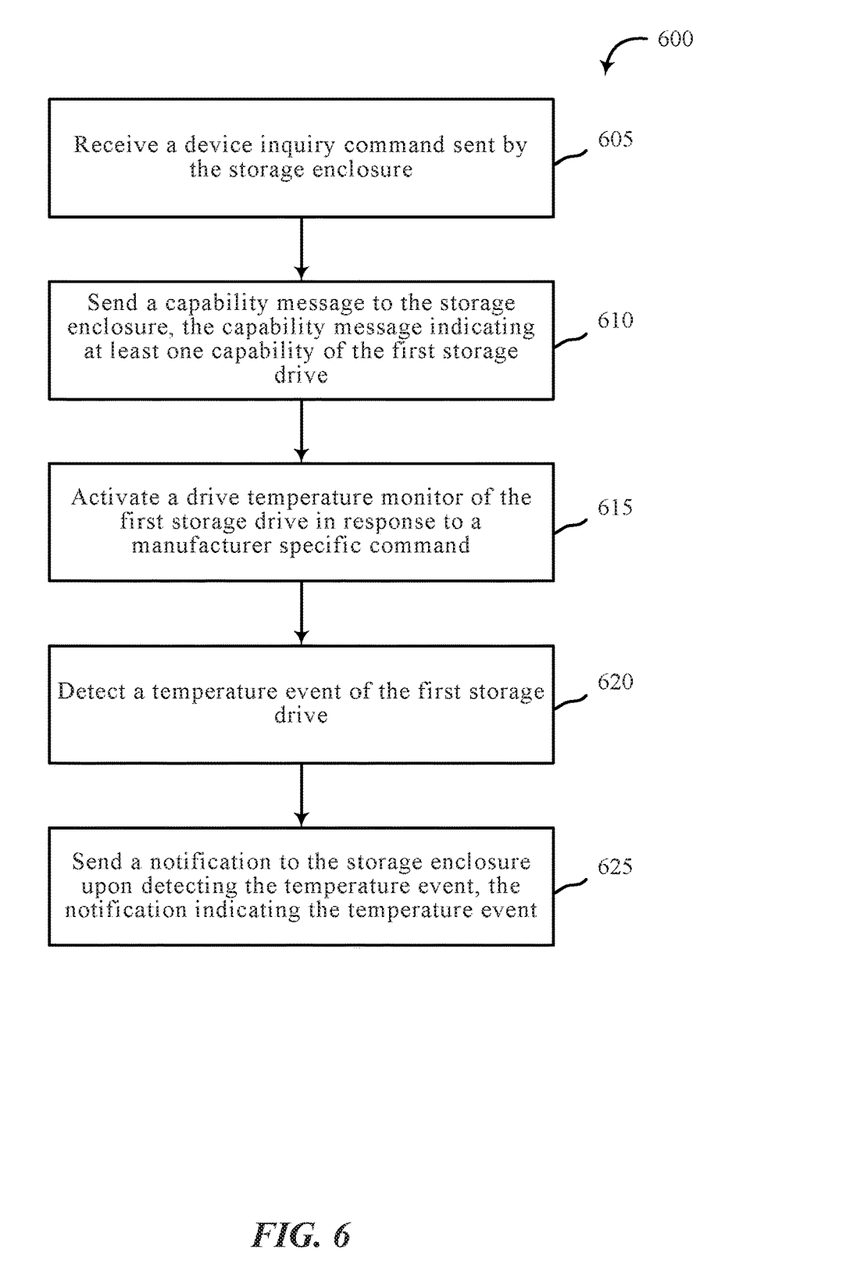
FIG. 6 is a flow chart illustrating an example of a method in accordance with various aspects of this disclosure.

FIG. 6 is a flow chart illustrating an example of a method 600 for integrated thermal management of storage drives, in accordance with various aspects of the present disclosure. One or more aspects of the method 600 may be implemented in conjunction with device 105 of FIG. 1, apparatus 205 of FIG. 2, and/or thermal management module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, method 600 may include receiving a device inquiry command sent by the storage enclosure. At block 610, method 600 may include sending a capability message to the storage enclosure, the capability message indicating at least one capability of the first storage drive.

At block 615, method 600 may include activating a drive temperature monitor of the first storage drive in response to a manufacturer specific command. In some cases, the storage enclosure may send the manufacturer specific command to the first storage drive upon identifying at least one identifier in the capability message and determining the at least one identifier indicates the first storage drive includes the drive temperature monitor.

At block 620, method 600 may include detecting a temperature event of the first storage drive. At block 625, method 600 may include sending a notification to the storage enclosure upon detecting the temperature event, the notification indicating the temperature event.

The operation(s) at block 605-625 may be performed using the thermal management module 130 described with reference to FIGS. 1-4 and/or another module. Thus, the method 600 may provide for integrated thermal management of storage drives. It should be noted that the method 600 is just one implementation and that the operations of the method 600 may be rearranged, omitted, and/or otherwise modified such that other implementations are possible and contemplated.

Figure 7:
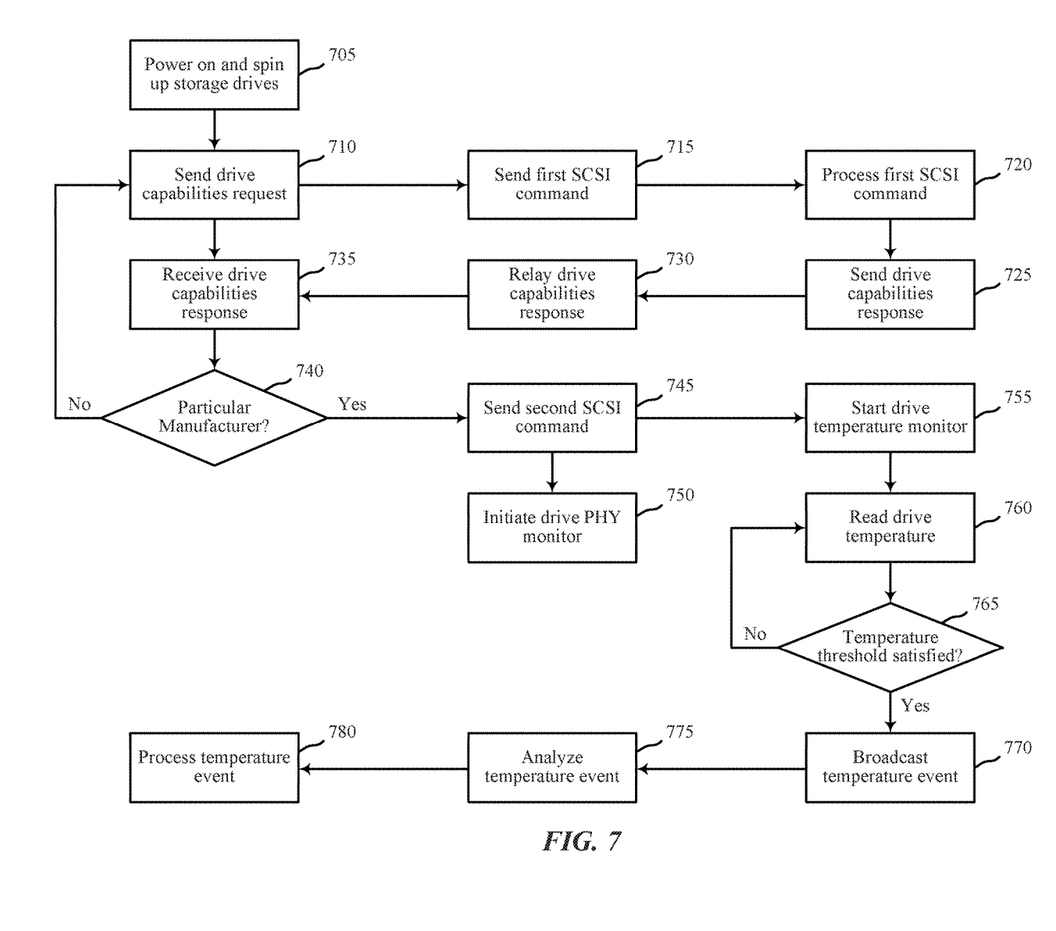
FIG. 7 is a flow chart illustrating an example of a method in accordance with various aspects of this disclosure.

FIG. 7 is a flow chart illustrating an example of a method 700 for integrated thermal management of storage drives, in accordance with various aspects of the present disclosure. One or more aspects of the method 700 may be implemented in conjunction with device 105 of FIG. 1, apparatus 205 of FIG. 2, and/or thermal management module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, the method 700 may include powering on and spinning up storage drives in a storage enclosure. At block 710, the method 700 may include sending a drive capabilities request to one or more storage drives in the storage enclosure. In some cases, the drive capabilities request may be received by an intermediary device and the intermediary device may relay the request to one or more storage drives.

At block 715, the method 700 may include sending a first SCSI command to at least one storage drive in the storage enclosure. In some cases, the first SCSI command may include the drive capabilities request in the form of a SCSI command. At block 720, the method 700 may include processing the first SCSI command.

At block 725, the method 700 may include sending a drive capabilities response. In some cases, the drive capabilities response may be sent by a storage drive based at least in part on the storage drive receiving the drive capabilities request and/or first SCSI command, and the storage drive processing the drive capabilities request and/or first SCSI command. At block 730, the method 700 may include relaying the drive capabilities response to a storage enclosure. For example, an intermediary device may receive the drive capabilities response from a storage drive and relay the drive capabilities response to the storage enclosure. In some cases, the intermediary device may analyze the drive capabilities response and identify information from the drive capabilities response based on the analysis. In some cases, the intermediary device may send at least a portion of the identified information to the storage enclosure.

At block 735, the method 700 may include receiving the drive capabilities response. In some cases, the storage enclosure may receive information obtained by the intermediary device along with the drive capabilities response. In some cases, the storage enclosure may analyze the drive capabilities response and identify information from the drive capabilities response based on the analysis. At block 740, the method 700 may include determining whether the drive capabilities response indicates the storage drive that sent the drive capabilities response is made by a particular manufacturer. Additionally or alternatively, method 700 may determine whether the storage drive includes a thermal management capability of the present systems and methods. In one example, the drive capabilities response may include one or more identifiers and at least one of the one or more identifies may indicate the manufacturer of the storage drive and/or a thermal management capability of the storage drive. For example, the analysis of the drive capabilities response performed by the intermediary device and/or storage enclosure may identify the one or more identifiers of the storage drive. Upon determining the storage drive is not from a particular manufacturer and/or determining the storage drive lacks a thermal management capability, method 700 may return to block 710 where another storage drive is selected and a drive capabilities request is sent to the newly selected storage drive. Upon determining the storage drive is from a particular manufacturer and/or determining the storage drive includes the thermal management capability, method 700 may proceed to block 745.

At block 745, the method 700 may include sending a second SCSI command. In one example, the second SCSI command may include a command to start a drive temperature monitor on the storage drive. At block 750, the method 700 may include starting a drive PHY monitor. In some cases, the drive PHY monitor may include a PHY chip on an intermediary device between the storage drive and the storage enclosure. In some cases, the drive PHY monitor may monitor messages from one or more storage drives connected to the intermediary device to detect thermal management messages.

At block 755, the method 700 may include starting the drive temperature monitor. For example, the storage drive may receive the second SCSI command, process the second SCSI command, and as a result of processing the second SCSI command start the drive temperature monitor. At block 760, the method 700 may include the drive temperature monitor reading a drive temperature of the storage drive.

At block 765, the method 700 may include determining whether the drive temperature read by the drive temperature monitor satisfies a temperature threshold. Upon determining the drive temperature read by the drive temperature monitor does not satisfy the temperature threshold, method 700 may return to block 760 to again read the drive temperature. Upon determining the drive temperature read by the drive temperature monitor does satisfy the temperature threshold, method 700 may proceed to block 770.

At block 770, the method 700 may include detecting a temperature event based at least in part on the drive temperature read by the drive temperature monitor satisfying the temperature threshold and broadcasting the temperature event. In some cases, the broadcasting of the temperature event may include an asynchronous message, where the asynchronous nature of the message is due at least in part on the message being generated and sent based on detection of the temperature event rather than being based on a cyclical monitoring of the temperature of the storage drive. As one example, the storage drive may generate a temperature event notification upon detecting the temperature event. At block 775, the method 700 may include analyzing the temperature event. In some cases, the intermediary device may receive the temperature event notification and analyze one or more aspects of the temperature event notification. Additionally or alternatively, the storage enclosure may receive the temperature event notification and analyze one or more aspects of the temperature event notification. In one example, analysis of the temperature event notification may include identifying the storage drive that generated and sent the temperature event notification.

At block 780, the method 700 may include processing the temperature event. As one example, the storage enclosure may receive the temperature event notification and/or receive analysis from the intermediary device and as part of processing the temperature event perform one or more actions based at least in part on temperature event notification and/or the analysis from the intermediary device. Additionally or alternatively, the storage enclosure may analyze the temperature event notification and as part of processing the temperature event perform one or more actions based at least in part on its own analysis of the temperature event notification.

In one embodiment, blocks 705, 710, 735, 740, and 780 of method 700 may be performed by or in conjunction with a storage enclosure such as storage enclosure 505 of FIG. 5. Additionally or alternatively, blocks 715, 730, 745, 750, and 775 of method 700 may be performed by or in conjunction with an intermediary device such as storage expander card 510 of FIG. 5. Additionally or alternatively, blocks 720, 725, 755, 760, 765, and 770 of method 700 may be performed by or in conjunction with a storage drive such as at least one of first storage drive 515 to Nth storage drive 520 of FIG. 5.

The operations at blocks 705-780 may be performed using the thermal management module 130 described with reference to FIGS. 1-4 and/or another module. Thus, the method 700 may provide for integrated thermal management of storage drives. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
    a storage enclosure;
    a plurality of storage drives enclosed in the storage enclosure and comprising at least a first storage drive; and
    one or more processors of the first storage drive configured to:
        activate a drive temperature monitor inside of the first storage drive in response to a manufacturer specific command;
        detect, in conjunction with the drive temperature monitor, a temperature event of the first storage drive; and
        send a notification to the storage enclosure upon detecting the temperature event, the notification indicating the temperature event.

2. The storage system of claim 1, wherein the storage enclosure determines the first storage drive includes the drive temperature monitor based at least in part on the storage enclosure identifying at least one identifier in a capability message from the first storage drive and determining the at least one identifier indicates the first storage drive includes the drive temperature monitor, and wherein the storage enclosure sends the manufacturer specific command to the first storage drive upon determining the capability message indicates the first storage drive includes the drive temperature monitor.

3. The storage system of claim 2, wherein the at least one identifier in the capability message includes a storage drive identifier unique to the first storage drive or a manufacturer identifier indicating a manufacturer of the first storage drive, or both.

4. The storage system of claim 1, wherein the device inquiry command includes a first small computer system interface (SCSI) command, and wherein the manufacturer specific command includes a second SCSI command, the second SCSI command configured to be interpreted only by storage drives made by the manufacturer of the first storage drive.

5. The storage system of claim 1, wherein the one or more processors of the first storage drive are further configured to:
    set a first temperature threshold of the first storage drive to a first value.

6. The storage system of claim 5, wherein the detecting of the temperature event of the first storage drive is based at least in part on the drive temperature monitor monitoring a temperature of the first storage drive and the processor of the first storage drive determining the monitored temperature satisfies the first temperature threshold.

7. The storage system of claim 5, wherein the one or more processors of the first storage drive are further configured to:
    set a second temperature threshold of a second storage drive to a second value, the second value being different than the first value, wherein the plurality of storage drives include the second storage drive.

8. The storage system of claim 1, wherein an intermediary device communicatively connects the plurality of storage drives to the storage enclosure, wherein the intermediary device relays commands and communications between the plurality of storage drives and the storage enclosure.

9. The storage system of claim 8, wherein the intermediary device includes a serially attached small computer system interface (SAS) expander, a peripheral component interconnect express (PCIe) switch, or both.

10. The storage system of claim 8, wherein a connection between the storage enclosure and the intermediary device includes an inter-integrated circuit (I2C) connection or an Ethernet connection, or both; and wherein a connection between the intermediary device and the plurality of storage drives includes a small computer system interface (SCSI) connection, a serially attached SCSI (SAS) connection, a serial advanced technology attachment (SATA) connection, or a peripheral component interconnect express (PCIe) connection, or any combination thereof.

11. A method to improve a storage system comprising:
    receiving, by a processor of a first storage drive, a device inquiry command sent by a storage enclosure, the storage enclosure including a plurality of storage drives that includes the first storage drive;
    sending, by the processor, a capability message to the storage enclosure, the capability message indicating at least one capability of the first storage drive;
    activating, by the processor, a drive temperature monitor inside of the first storage drive in response to a manufacturer specific command, the storage enclosure sending the manufacturer specific command to the first storage drive upon determining the capability message indicates the first storage drive includes the drive temperature monitor;

detecting, by the processor in conjunction with the drive temperature monitor, a temperature event of the first storage drive; and sending, by the processor, a notification to the storage enclosure upon detecting the temperature event, the notification indicating the temperature event.

12. The method of claim 11, wherein the storage enclosure determines the first storage drive includes the drive temperature monitor based at least in part on the storage enclosure identifying at least one identifier in the capability message and determining the at least one identifier indicates the first storage drive includes the drive temperature monitor.

13. The method of claim 12, wherein the at least one identifier in the capability message includes a storage drive identifier unique to the first storage drive or a manufacturer identifier indicating a manufacturer of the first storage drive, or both.

14. The method of claim 11, wherein the device inquiry command includes a first small computer system interface (SCSI) command, and wherein the manufacturer specific command includes a second SCSI command, the second SCSI command configured to be interpreted only by storage drives made by the manufacturer of the first storage drive.

15. The method of claim 11, further comprising:
setting a first temperature threshold of the first storage drive to a first value.

16. The method of claim 15, wherein the detecting of the temperature event of the first storage drive is based at least in part on the drive temperature monitor monitoring a temperature of the first storage drive and the processor of the first storage drive determining the monitored temperature satisfies the first temperature threshold.

17. The method of claim 15, further comprising:
setting a second temperature threshold of a second storage drive to a second value, the second value being different than the first value, wherein the plurality of storage drives include the second storage drive.

18. The method of claim 11, wherein an intermediary device communicatively connects the plurality of storage drives to the storage enclosure, wherein the intermediary device relays commands and communications between the plurality of storage drives and the storage enclosure.

19. A computer-program product to improve a storage system, the computer-program product comprising a non-transitory computer-readable medium storing instructions thereon, the instructions being executable by one or more processors of a first storage drive to perform the steps of:

receiving a device inquiry command sent by a storage enclosure;

sending a capability message to the storage enclosure, the capability message indicating at least one capability of the first storage drive;

activating a drive temperature monitor inside of the first storage drive in response to a manufacturer specific command, the storage enclosure sending the manufacturer specific command to the first storage drive upon identifying at least one identifier in the capability message and determining the at least one identifier indicates the first storage drive includes the drive temperature monitor;

detecting, in conjunction with the drive temperature monitor, a temperature event of the first storage drive; and sending a notification to the storage enclosure upon detecting the temperature event, the notification indicating the temperature event.

20. The computer-program product of claim 19, wherein the at least one identifier in the capability message includes a storage drive identifier unique to the first storage drive or a manufacturer identifier indicating a manufacturer of the first storage drive, or both.

* * * * *